United States Patent
Birau et al.

(10) Patent No.: US 8,367,751 B2
(45) Date of Patent: Feb. 5, 2013

(54) TRI-COMPONENT RESINS FOR PIGMENTED INK

(75) Inventors: Maria Birau, Mississauga (CA); C. Geoffrey Allen, Waterdown (CA); Carol A. Jennings, Toronto (CA); Peter G. Odell, Mississauga (CA)

(73) Assignee: Xerox Corporation, Norwalk, CT (US)

(*) Notice: Subject to any disclaimer, the term of this patent is extended or adjusted under 35 U.S.C. 154(b) by 89 days.

(21) Appl. No.: 12/891,619

(22) Filed: Sep. 27, 2010

(65) Prior Publication Data

US 2012/0077913 A1     Mar. 29, 2012

(51) Int. Cl.
| | |
|---|---|
| C08G 18/28 | (2006.01) |
| C08G 63/685 | (2006.01) |
| C08G 67/02 | (2006.01) |
| C08J 3/00 | (2006.01) |
| C08K 5/00 | (2006.01) |
| C09D 5/00 | (2006.01) |
| C09D 11/00 | (2006.01) |

(52) U.S. Cl. .......... 523/160; 106/31.13; 106/31.57; 106/31.58; 106/31.85; 106/31.86; 523/161; 524/210; 524/217; 524/218; 524/219; 524/221; 524/612

(58) Field of Classification Search ........ 106/31.13, 106/31.57, 31.58, 31.85, 31.86; 523/160, 523/161; 524/210, 217, 218, 219, 221, 612
See application file for complete search history.

(56) References Cited

U.S. PATENT DOCUMENTS

| | | | |
|---|---|---|---|
| 6,174,937 B1 | 1/2001 | Banning et al. | |
| 6,989,052 B1 * | 1/2006 | Wu et al. .......... | 106/31.29 |
| 2007/0203272 A1 | 8/2007 | Heinrichs | |
| 2007/0283846 A1 * | 12/2007 | Breton et al. .......... | 106/31.61 |

FOREIGN PATENT DOCUMENTS

EP     1826235     8/2009

* cited by examiner

Primary Examiner — Patrick Niland
(74) Attorney, Agent, or Firm — Pillsbury Winthrop Shaw Pittman LLP

(57) ABSTRACT

A solid ink that includes an ink carrier and a resinous compound of the formulas

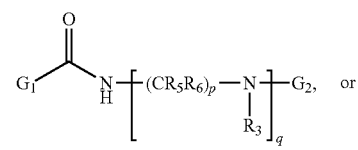

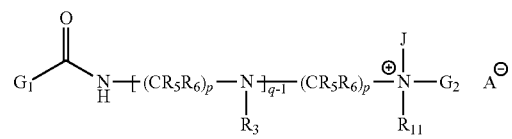

or a salt thereof, wherein $G_1$ is —$X_1C(O)OR_1$, —$X_2OC(O)R_2$, or —$X_2OH$; $G_2$ is $R_4$, $R_{12}$, —$C(O)R_2$, —$C(O)X_1C(O)OR_1$, or —$C(O)X_2OC(O)R_2$; $R_1$ is an alkyl having from 10 to 80 carbon atoms; $R_2$ is an alkyl having from 2 to 40 carbon atoms; each $R_3$ and $R_4$ is independently hydrogen, alkyl, arylalkyl or alkylaryl; each $R_5$ and each $R_6$ is independently hydrogen or alkyl; $X_1$ and $X_2$ are both a straight or branched alkylene group; t1 is 1 to 20; t2 and t3 is independently 0 to 20; u1 is 1 to 30; u2 and u3 is independently 0 to 30; each $R_7$ and each $R_8$ is independently hydrogen, alkyl, or alkoxyl; each $R_9$ and each $R_{10}$ is independently hydrogen, alkyl, or alkoxyl; Ar is a substituted or unsubstituted aromatic moiety; p is 1 to 5; q is 1 to 12; $A^\ominus$ is selected from the group consisting of $Cl^-$, $Br^-$, $I^-$, $HSO_4^-$, $HSO_3^-$, $CH_3SO_3^-$, $NO_3^-$, $HCOO^-$, $CH_3COO^-$, $H_2PO_4^-$, $SCN^-$, $ClO_4^-$, $SSO_3^-$, $PF_6^-$, and $SbCl_6^-$; and J is alkyl, arylalkyl, or alkylaryl.

19 Claims, 1 Drawing Sheet

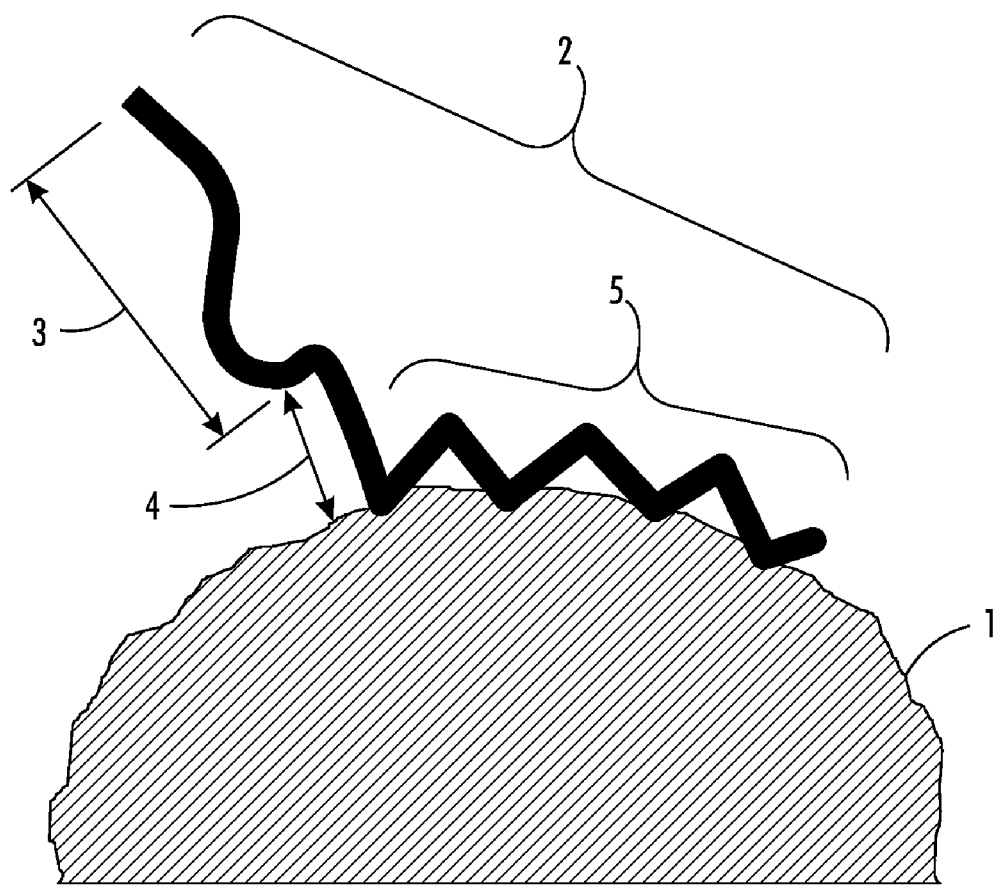

TRI-COMPONENT RESINS FOR PIGMENTED INK

CROSS REFERENCE TO RELATED APPLICATIONS

Reference is made to co-pending, U.S. patent application Ser. No. 12/891,656 to Birau et al., filed concurrently herewith, entitled, "Synthesis of Tri-Component Resins", published as US 2012-0077953 A1, the entire disclosure of which is incorporated herein by reference in its entirety, which discloses a compound of the formula

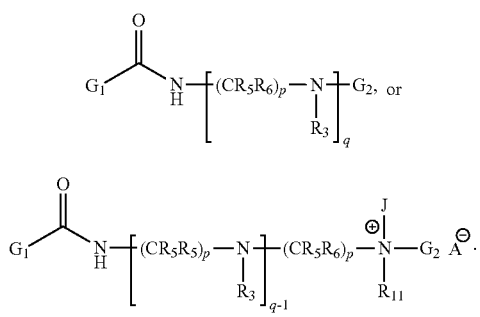

BACKGROUND

The disclosure relates generally to inks, for example, solid inks or solid inkjet inks. More specifically, the disclosure relates to resinous compounds particularly compatible with or useful as compositions useful in stabilizing pigment particles in solid inks at high temperatures. One embodiment is directed to an ink comprising a resinous compound comprise a long chain having at least 10 carbon atoms for stabilizing pigment particles in solid inks, and further comprise amines for adsorbing onto the pigment particle surface.

Pigments generally offer better colorfastness over dyes, and are characterized by low specific gravity and greater resistance to migration than dyes. In addition, pigment-based inks are more robust than dye-based inks, and are relatively much less expensive than dye colorants, especially custom dye colorants. However, many of the solid ink jet ink compositions contain dye colorants instead of pigment colorants, because it is difficult to overcome the challenges in developing pigment-based inks. The challenges include properly dispersing the pigment particles in the ink and being able to reliably jet the ink without clogging the printheads by the pigment particles.

Pigments are known to be hard to disperse in most media because they tend to aggregate in large structures. In addition, print-heads are typically operated at high temperatures, for example, from 115° C. to 120° C., which has a destabilizing influence on the pigment dispersion.

Many of the commercially available polymeric dispersants are designed for aqueous based or solvent based inks, and therefore, they are not compatible with the hydrophobic wax based solid inks. Further, these polymeric dispersants are in liquid or paste forms, thus they cannot withstand the excessive temperatures in the printer for long periods of time. Lastly, the use of polymers in solid ink is not favored because: a) polymers have a negative impact on rheological properties producing non-newtonian behavior which cause viscosity to increase, b) polymers tend to form filaments which affect drop formation of the ink during jetting (i.e. the formation of small drop sizes of the ink).

Thus, there exists a need for resinous compounds that are chemically stable, are compatible with the solid ink formulation, and are capable of effectively dispersing and stabilizing pigment particles in solid inks over long periods of time at high temperatures.

In order to solve the above-identified problems, this disclosure describes resinous compounds that are capable of providing steric stabilization of the pigment particles in solid ink, and being able to be adsorbed (or anchored) to the pigment particle surface.

FIG. 1 illustrates a pigment stabilizing resinous compound 2 being anchored onto a pigment particle 1. The pigment stabilizing resinous compound (or resinous compound, or tri-component resins) 2 comprises a waxy chain that contains two components (i.e. a hydrocarbon long chain or a polymeric long chain at the tail end of the molecule, and a chain extensor at the middle part of the molecule) known as a brush or a stabilizing tail, for providing steric stabilization of the pigment particles in solid ink, or for being compatible with the non-polar wax based solid ink. Because longer stabilizing tails improve stabilization of pigments in solid ink, the chain extensor helps to increase the length of the waxy chain. For solid inks composed mainly of polyethylene wax, therefore in some embodiments, a suitable brush would be polyethylene wax based, and the like, although other materials can also be used for the brush. The pigment stabilizing resinous compound (or resinous compound, or tri-component resins) 2 further comprises functional groups 5, which includes but are not limited to various amines, that can strongly adsorb (or anchor) onto the pigment particles surface through hydrogen bonding to provide pigment stabilization, so that the pigments can withstand high temperatures (>100° C.) used in most solid ink printers. In some instances regarding pigment particle stabilization of inks and the like, it can be advantageous to have the pigment particles stabilized through adsorption of the stabilizing resinous compound 2 onto the pigment particle 1 such that the functional groups 5 of the stabilizing resinous compound 2 are anchored onto the pigment. The waxy chain 3 and/or 4 of the stabilizing resinous compound 2 are optimally selected for both its molecular weight and its miscibility with the ink carrier in such a way that the stabilizing resinous compound provides an effective steric barrier that hinders pigment particle flocculation.

SUMMARY

The present embodiments are directed to an ink composition comprises an ink carrier and a resinous compound of the formula:

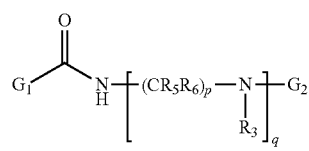

or a salt thereof, wherein:

$G_1$ is $-X_1C(O)OR_1$, $-X_2OC(O)R_2$, or $-X_2OH$;

$G_2$ is $R_4$, $-C(O)R_2$, $-C(O)X_1C(O)OR_1$, or $-C(O)X_2OC(O)R_2$;

$R_1$ is an alkyl having from 10 to 80 carbon atoms;

$R_2$ is independently an alkyl having from 2 to 40 carbon atoms;

each $R_3$ and $R_4$ is independently hydrogen, alkyl, arylalkyl or alkylaryl, wherein the $R_3$ attached to the same nitrogen atom as $R_4$ and $R_4$ can be joined together to form a ring;

each $R_5$ and each $R_6$ is independently hydrogen or alkyl;

$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;

$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;

t1 is an integer of from 1 to 20;

t2 and t3 is independently an integer of from 0 to 20;

u1 is an integer from 1 to 30;

u2 and u3 is independently an integer from 0 to 30;

each $R_7$ and each $R_8$ is independently hydrogen, alkyl, or alkoxyl;

each $R_9$ and each $R_{10}$ is independently hydrogen, alkyl, or alkoxyl;

Ar is a substituted or unsubstituted aromatic moiety;

p is an integer from 1 to 5; and q is an integer from 1 to 12.

In one embodiment, $G_1$ is —$X_1C(O)OR_1$. In one embodiment, $G_1$ is —$X_2OC(O)R_2$. In one embodiment, $G_2$ is —$C(O)R_2$. In one embodiment, $G_2$ is —$C(O)X_1C(O)OR_1$. In one embodiment, $G_2$ is —$C(O)X_2OC(O)R_2$.

In certain embodiments, $R_1$ is an alkyl comprising from 30 to 50 carbon atoms. In certain embodiments, $R_2$ is an alkyl comprising from 4 to 20 carbon atoms. In certain embodiments, $X_1$ is an a straight or branched alkylene group having the formula $(CR_7R_8)_{t1}$. In certain embodiments, $X_2$ is a straight or branched alkylene group having the formula $(CR_9R_{10})_{u1}$. In one embodiment, each $R_3$ is hydrogen. In one embodiment, $G_2$ is $R_4$. In one embodiment, each $R_5$ and each $R_6$ are hydrogen. In one embodiment, p is an integer from 2 to 3. In one embodiment, q is an integer from 1 to 8.

In certain embodiments, the ink composition have the formula

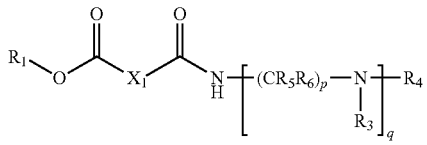

or a salt thereof, wherein:

$R_1$ is an alkyl having from 10 to 80 carbon atoms;

each $R_3$ and $R_4$ is independently hydrogen, alkyl, arylalkyl or alkylaryl, wherein the $R_3$ attached to the same nitrogen atom as $R_4$ and $R_4$ can be joined together to form a ring;

each $R_5$ and each $R_6$ is independently hydrogen or alkyl;

$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;

t1 is an integer of from 1 to 20;

t2 and t3 is independently an integer of from 0 to 20;

each $R_7$ and each $R_8$ is independently hydrogen, alkyl, or alkoxyl;

Ar is a substituted or unsubstituted aromatic moiety;

p is an integer from 1 to 5; and q is an integer from 1 to 12.

In certain embodiments, the resinous compound of the formula I is present in the ink in the amount of from about 0.1 percent to about 30 percent by weight of the ink. In certain embodiments, the ink carrier comprises a wax selected from the group consisting of polyethylene wax, isocyanate-derived resin and wax, ester wax, fatty acid, fatty alcohol, fatty amide, and alkoxylated wax. In certain embodiments, the ink carrier further comprises a branched triamide present in the ink in an amount of from about 0.01 percent to about 30 percent by weight of the ink. In certain embodiments, the ink carrier further comprises a stearyl stearamide present in the ink in an amount of from about 0.5 percent to about 70 percent by weight of the ink. In certain embodiments, the ink composition further comprises a triglyceride of hydrogenated abietic acid present in the ink in an amount of from about 0.1 percent to about 50 percent by weight of the ink.

In certain embodiments, an ink composition comprising an ink carrier and a resinous compound salt of the formula

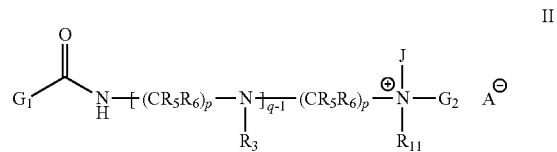

wherein:

$G_1$ is —$X_1C(O)OR_1$, —$X_2OC(O)R_2$, or —$X_2OH$;

$G_2$ is, $R_{12}$, —$C(O)R_2$, —$C(O)X_1C(O)OR_1$, or —$C(O)X_2OC(O)R_2$;

$R_1$ is an alkyl having from 10 to 80 carbon atoms;

$R_2$ is an alkyl having from 2 to 40 carbon atoms;

each $R_3$ is independently hydrogen, alkyl, arylalkyl or alkylaryl;

each $R_{11}$ and $R_{12}$ is independently alkyl, arylalkyl, alkylaryl, or $R_{11}$ and $R_{12}$ can be joined together to form a ring;

each $R_5$ and each $R_6$ is independently hydrogen or lower alkyl;

$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;

$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;

t1 is an integer of from 1 to 20;

t2 and t3 is independently an integer of from 0 to 20;

u1 is an integer from 1 to 30;

u2 and u3 is independently an integer from 0 to 30;

each $R_7$ and each $R_8$ is independently hydrogen, alkyl, or alkoxyl;

each $R_9$ and each $R_{10}$ is independently hydrogen, alkyl, or alkoxyl;

Ar is a substituted or unsubstituted aromatic moiety;

p is an integer from 1 to 5;

q is an integer from 1 to 12;

$A^\ominus$ is selected from the group consisting of $Cl^-$, $Br^-$, $I^-$, $HSO_4^-$, $HSO_3^-$, $CH_3SO_4^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, and $SbCl_6^-$; and J is alkyl, arylalkyl, or alkylaryl. In one embodiment, J is methyl.

In certain embodiments, $R_{11}$ and $R_{12}$ is independently methyl or ethyl.

In certain embodiments, the resinous compound further comprises a pigment.

It is understood that other embodiments may be utilized and structural and operational changes may be made without departure from the scope of the embodiments disclosed herein.

DETAILED DESCRIPTION

Definition:

The term "alkylene," refers to a straight or branched chain, divalent, saturated hydrocarbon group. The alkylene group may be optionally substituted, for example with a hydrocarbyl substituent or with a heterohydrocarbyl substituent. The term "hydrocarbyl," refers to a substituent having only one or more carbon atoms and one or more hydrogen atoms and the term "heterohydrocarbyl," refers to a substituent having one or more carbon atoms, one or more hydrogen atoms, and one or more hetero-atoms (i.e. one or more atoms that are neither carbon nor hydrogen). The term "aromatic alkylene," refers to a straight or branched chain hydrocarbon group containing an aromatic moiety. The substituents of an "optionally substituted" group may include, without limitation, one or more substituents independently selected from the following groups or a particular designated set of groups, alone or in combination: lower alkyl, lower alkenyl, lower alkynyl, lower alkanoyl, lower heteroalkyl, lower heterocycloalkyl, lower haloalkyl, lower haloalkenyl, lower haloalkynyl, lower perhaloalkyl, lower perhaloalkoxy, lower cycloalkyl, phenyl, aryl, aryloxy, lower alkoxy, lower haloalkoxy, oxo, lower acyloxy, carbonyl, carboxyl, lower alkylcarbonyl, lower carboxyester, lower carboxamido, cyano, hydrogen, halogen, hydroxy, amino, lower alkylamino, arylamino, amido, nitro, thiol, lower alkylthio, arylthio, lower alkylsulfinyl, lower alkylsulfonyl, arylsulfinyl, arylsulfonyl, arylthio, sulfonate, sulfonic acid, trisubstituted silyl, $N_3$, SH, $SCH_3$, $C(O)CH_3$, $CO_2CH_3$, $CO_2H$, pyridinyl, thiophene, furanyl, lower carbamate, and lower urea.

The term "aliphatic," describes a chemical moiety which is not aromatic and does not comprise an aromatic component. An aliphatic chain can be linear, branched, cyclic, saturated or partially unsaturated hydrocarbyl groups, including alkylene groups, for example, polymethylene groups such as —$(CH_2)_n$—, wherein n is an integer from 1 to about 100, and cycloalkylene groups. The alkylene group can be substituted or unsubstituted. Suitable alkylene substituents include hydroxyl groups and halogen atoms, for example, fluorine, chlorine and bromine atoms. The alkylene group can also, optionally, be interrupted at one or more points by a heteroatom, such as an oxygen, nitrogen or sulfur atom. The aliphatic spacer group can also be a partially unsaturated group, such as a substituted or unsubstituted $C_2$-$C_{100}$ alkenylene group or a $C_2$-$C_{100}$ alkenylene group interrupted at one or more points by a heteroatom.

The term "alkyl," refers to a straight chain or branched chain alkyl radical. Alkyl groups may be optionally substituted as defined herein. The term "lower alkyl," refers to a straight chain or branched alkyl group having from 1 to 8 carbon atoms, or from 1 to 6, or from 1 to 3 carbon atoms.

The term "arylalkyl," refers to an aryl group attached to the parent molecular moiety through an alkyl group.

The term "alkylaryl," refers to an alkyl group attached to the parent molecular moiety through an aryl group.

The term "aromatic" as used herein alone or as part of another group denote optionally substituted homo- or heterocyclic aromatic groups. These aromatic groups may be monocyclic or bicyclic groups containing from 5 to 12 atoms in the ring portion. The term "aromatic" encompasses the "aryl" and "heteroaryl" groups defined below.

The terms "aryl" as used herein alone or as part of another group denote optionally substituted homocyclic aromatic groups, preferably monocyclic or bicyclic groups containing from 5 to 12 carbons in the ring portion, such as phenyl, biphenyl, naphthyl, substituted phenyl, substituted biphenyl or substituted naphthyl.

The compound of the formulas I or II is present in the ink in the amount of from about 0.1 percent to about 30 percent by weight of the ink, from about 0.5 percent to about 20 percent by weight of the ink, or from about 1 percent to about 10 percent by weight of the ink.

The ink compositions of the present embodiments contain a pigment. There is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present embodiments are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JPA-2002-188025, JP-A-2003-26978, and JP-A-2003-342503.

Specific examples of the organic pigment and the inorganic pigment that can be used in the present embodiments include, as those exhibiting a yellow color, monoazo pigments such as CI Pigment Yellow 1 and CI Pigment Yellow 74, disazo pigments such as CI Pigment Yellow 12 and CI Pigment Yellow 17, benzidine-free azo pigments such as CI Pigment Yellow 180 and C.I. Pigment Yellow 200, azo lake pigments such as CI Pigment Yellow 100, condensed azo pigments such as CI Pigment Yellow 95, acidic dye lake pigments such as CI Pigment Yellow 115, basic dye lake pigments such as CI Pigment Yellow 18, anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139) nitroso pigments such as CI Pigment Yellow 153, and metal complex azomethine pigments such as CI Pigment Yellow 117.

Examples of pigments exhibiting a red or magenta color include monoazo pigments such as CI Pigment Red 3, disazo pigments such as CI Pigment Red 38, azo lake pigments such as CI Pigment Red 53:1 and CI Pigment Red 57:1 condensed azo pigments such as CI Pigment Red 144, acidic dye lake pigments such as CI Pigment Red 174, basic dye lake pigments such as CI Pigment Red 81, anthraquinone pigments such as CI Pigment Red 177, thioindigo pigments such as CI Pigment Red 88, perinone pigments such as CI Pigment Red 194, perylene pigments such as CI Pigment Red 149, quinacridone pigments such as CI Pigment violet 19 and CI Pigment Red 122, isoindolinone pigments such as CI Pigment Red 180, and alizarin lake pigments such as CI Pigment Red 83.

Examples of pigments exhibiting a blue or cyan color include disazo pigments such as CI Pigment Blue 25, phthalocyanine pigments such as CI Pigment Blue 15 and CI Pigment Blue 15:3, acidic dye lake pigments such as CI Pigment Blue 24, basic dye lake pigments such as CI Pigment Blue 1, anthraquinone pigments such as CI Pigment Blue 60, and alkali blue pigments such as CI Pigment Blue 18.

Examples of pigments exhibiting a green color include phthalocyanine pigments such as CI Pigment Green 7 and CI Pigment Green 36, and azo metal complex pigments such as CI Pigment Green 8.

Examples of pigments exhibiting an orange color include isoindoline pigments such as CI Pigment Orange 66 and anthraquinone pigments such as CI Pigment Orange 51.

Examples of pigments exhibiting a black color include carbon black, titanium black, and aniline black. Examples of the carbon black include SPECIAL BLACK 250.

Specific examples of white pigments that can be used include basic lead carbonate ($2PbCO_3Pb(OH)_2$, also known as silver white), zinc oxide ($ZnO$, also known as zinc white), titanium oxide ($TiO_2$, also known as titanium white), and strontium titanate ($SrTiO_3$, also known as titan strontium white).

The pigments present in inks of the present embodiments can be in any desired or effective amount to obtain the desired color or hue. In embodiments, the pigments is present in the inks in an amount of from about 0.1 percent to about 50 percent by weight of the inks, from about 0.2 percent to about 20 percent by weight of the inks, or from about 0.5 percent to about 10 percent by weight of the inks.

The ink carrier composition can be designed for use in either a direct printing mode or an indirect or offset printing transfer system. Any desired or effective ink carrier composition can be used. The total amount of ink carrier present in the ink of the present embodiments can be from about 25 percent to about 99 percent by weight of the ink, from about 50 percent to about 95 percent by weight of the ink, or from about 70 percent to about 90 percent by weight of the ink.

Representative examples of references disclosing compositions suitable for use as ink carrier compositions include U.S. Pat. Nos. 3,653,932, 4,390,369, 4,484,948, 4,684,956, 4,830,671, 4,851,045, 4,889,560, 4,889,761, 5,006,170, 5,151,120, 5,194,638, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference.

Suitable ink carrier materials can include paraffins, microcrystalline waxes, polyethylene waxes, isocyanate-derived resins and waxes, ester waxes, fatty acids, fatty alcohols, fatty amide, alkoxylated wax and other waxy materials, sulfonamide materials, resinous materials made from different natural sources (tall oil rosins and rosin esters, for example), and many synthetic resins, oligomers, polymers, and copolymers, and mixtures thereof. An alkoxylated wax is a wax material comprising one or poly(alkoxy) groups.

Examples of suitable fatty amides as ink carrier materials include monoamides, tetraamides, mixtures thereof, and the like. Specific examples of suitable fatty amide ink carrier materials include stearyl stearamide (e.g. KEMAMIDE S-180 was obtained from Chemtura Corporation), a dimer acid based tetra-amide that is the reaction product of a dimer acid, ethylene diamine, and stearic acid, and the like, as well as mixtures thereof. In one embodiment, a monoamide, such as stearyl stearamide, is present in the inks in an amount of from 0.01 percent to about 90 percent by weight of the ink, in an amount of from 0.5 percent to about 70 percent by weight of the ink, or in an amount of from 1 percent to about 50 percent by weight of the ink.

Examples of suitable isocyanate-derived resins and waxes as ink carrier materials include urethane isocyanate-derived materials, urea isocyanate-derived materials, urethane/urea isocyanate-derived materials, and the like, as well as mixtures thereof.

Examples of suitable oligomers, polymers and copolymers as ink carrier materials include ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof.

Non-limiting specific examples of suitable polyethylene waxes as ink carrier materials include PE 500 (e.g. X-1197 which is a distilled polyethelene) and PE 655, available from Baker Petrolite, Tulsa, Okla., Fischer-Tropsch waxes, available from Sasol Wax Americas, Inc., Shelton, Conn., waxes as disclosed in, for example, U.S. Patent Publication No. 2006-0257495 A1 and U.S. Patent Publication 2005/0130054, the disclosures of which are totally incorporated herein by reference, and waxes as disclosed in U.S. Pat. No. 7,407,539 issued Aug. 5, 2008, U.S. Pat. No. 7,377,971 issued May 27, 2008, U.S. Pat. No. 7,381,254 issued Jun. 3, 2008, U.S. Pat. No. 7,311,768 issued Dec. 25, 2007, and U.S. Pat. No. 7,658,486 issued Feb. 9, 2010, the disclosures of each of which are totally incorporated herein by reference.

In addition, the ink carrier described in U.S. Pat. No. 6,906,118, which is incorporated herein by reference in its entirety, may also be used. The ink carrier may contain a branched triamide such as those described in U.S. Pat. No. 6,860,930, the disclosure of which is also incorporated by reference herein in its entirety. One specific example of such branched triamide is Tri-A-37. In one embodiment, the branched triamide is present in the ink in an amount of from about 0.01 percent to about 30 percent by weight of the ink, from about 0.03 percent to about 20 percent by weight of the ink, or from about 0.05 percent to about 15 percent by weight of the ink.

In one embodiment, the ink carrier can contain a urethane resin that is the adduct of three equivalents of stearyl isocyanate and a glycerol-based alcohol prepared as described in Example 4 of U.S. Pat. No. 6,309,453. When present, this resin is present in the ink in an amount of from about 0.01 percent to about 30 percent by weight of the ink, from about 0.03 percent to about 20 percent by weight of the ink, or from about 0.05 percent to about 10 percent by weight of the ink.

The inks of can optionally contain an antioxidant. The optional antioxidants of the ink compositions can protect the images from oxidation and can also protect the ink components from oxidation during the heating portion of the ink preparation process. Specific examples of suitable antioxidants include NAUGUARD® 635, NAUGUARD® A, NAUGUARD® 1-403, NAUGUARD® 959 (commercially available from Crompton Corporation, Middlebury, Conn.); NAUGUARD® 524, NAUGUARD® 76, NAUGUARD® 445 (commercially available from Chemtura Corporation) and NAUGUARD® 512 (commercially available from Chemtura Corporation), IRGANOX® 1010 (commercially available from Ciba Geigy), and the like, as well as mixtures thereof. When present, the optional antioxidant is present in the ink in any desired or effective amount. In embodiments, the optional antioxidant is present in the ink in the amount from about 0.01 percent to about 20 percent by weight of the ink, from about 0.1 percent to about 10 percent by weight of the ink, or from about 0.25 percent to about 5 percent by weight of the ink.

The inks can optionally contain a viscosity modifier. Examples of suitable viscosity modifiers include aliphatic ketones, such as stearone, and the like. When present, the optional viscosity modifier is present in the ink in any desired or effective amount. In embodiments, the optional viscosity modifier is present in the ink in the amount from about 0.1 percent to about 90 percent by weight of the ink, from about 0.5 percent to about 30 percent by weight of the ink, or from about 1 percent to about 15 percent by weight of the ink.

The inks can optionally contain additives to the inks. Examples of suitable additives include clarifiers, such as UNION CAMP® X37-523-235 (commercially available from Union Camp), in an amount of from about 0.01 to about 98 percent by weight of the ink, from about 0.1 to about 50 percent by weight of the ink, or from about 5 to about 10 percent by weight of the ink; tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount of from about 0.01 percent to about 98 percent by weight of the ink, from about 0.1 percent to about 50 percent by weight of the ink, or from about 5 percent to about 10 percent by weight of the ink; adhesives, such as VERSAMID® 757, 759, or 744 (commercially available from Henkel), in an amount of from about 0.1 percent to about 98 percent by weight of the ink, in an amount of from about 3 percent to about 50 percent by weight of the ink, or in an amount of from about 5 percent to about 10 percent by weight of the ink; plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount of from about 0.1 percent to about 50 percent by weight of the ink, in an amount of from about 1 percent to about 30 percent by weight of the ink, or in an amount of from about 2 percent to about 10 percent by weight of the ink.

The inks can also optionally contain other materials.

The ink compositions of the present embodiments at a temperature of between 100° C. to about 150° C. have an average particle size of from about 100 nm to about 500 nm, from about 100 nm to about 200 nm, or from about 250 to about 400 nm. The inks containing tri-component resins of the embodiments have good particle size thermal stability characteristics over long periods of time, such as greater than a week, in contrast to those inks having the same pigments but dispersed with commercial dispersants, for example, such as SOLSPERSE 17000 and SOLSPERSE 13940.

The ink compositions can be prepared by any desired or suitable method. In embodiments, the ink ingredients can be mixed together, followed by heating, to a temperature of from about 100° C. to about 140° C., and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks of the embodiments can be employed in apparatus for direct printing ink jet processes and in indirect (offset) printing ink jet applications. Another embodiment of the present embodiments is directed to a process which comprises incorporating an ink of the present embodiments into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present embodiments is directed to a process which comprises incorporating an ink of the present embodiments into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment thereof, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present embodiments can also be employed in other hot melt printing processes, such as hot melt acoustic ink jet printing, hot melt thermal ink jet printing, hot melt continuous stream or deflection ink jet printing, and the like. Phase change inks of the present embodiments can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Various resinous compounds were prepared according to the methods described above.

Pigments Used in Solid Ink Preparation

The following pigments: Pigment Red 57:1, specifically Permanent Rubine L5B 01 (PR57:1), Pigment Yellow 180, and Pigment Yellow 139 (PY39), were used for the preparation of magenta and yellow inks.

Preparation of Yellow Pigmented Solid Inks

Example 1

Preparation of Ink No. 1

A Union Process 01 attritor pre-heated to 120° C. was charged with 1800 g ⅛" 440 C Grade 25 stainless steel balls, available from Hoover Precision Products, Incorporated, that were preheated to 120° C. Over the steel shots was poured a molten mixture containing 68.4 g triamide wax (triamide described in U.S. Pat. No. 6,860,930, 62.4 g S-180, 15.36 g Compound No. 1 and 19.2 g pigment yellow 139. A multi-staged impeller was then attached to the attritor and the speed adjusted to about 300 rpm. The pigmented mixture was allowed to attrite overnight for 19 hours upon which the resultant ink concentrate showed excellent free-flowing behavior when it was discharged and separated from the steel balls in its molten state. The beaker containing the isolated pigment concentrate is maintained at 120° C., and the concentrate was then diluted over a period of 60 minutes with a molten resin mixture containing 244.5 g X1197, available from Baker Petrolite, 6 g KEMAMIDE S-180, available from Chemtura Corporation, 58.08 g KE-100, available from Arakawa Corporation, 7.2 g of a urethane resin that is the adduct of three equivalents of stearyl isocyanate and a glycerol-based alcohol, prepared as described in Example 4 of U.S. patent, and 0.96 g NAUGARD 445, available from Chemtura Corporation. The resulting ink was allowed to stir for 90 minutes at 120° C. and was filtered through a 1 micron filter.

Example 2

Preparation of Ink No. 2

A Union Process 01 attritor pre-heated to 120° C. was charged with 1800 g ⅛" 440 C Grade 25 stainless steel balls, available from Hoover Precision Products, Incorporated, that were also preheated to 120° C. Over the steel shots was poured a molten mixture containing 68.4 g triamide wax (triamide described in U.S. Pat. No. 6,860,930, 62.4 g S-180, 15.36 g Compound No. 3 (see Table 3) and 19.2 g pigment yellow 180. A multi-staged impeller was then attached to the attritor and the speed adjusted to about 300 rpm. The pigmented mixture was allowed to attrite overnight for 19 hours upon which the resultant ink concentrate showed excellent free-flowing behavior when it was discharged and separated from the steel balls in its molten state. The beaker containing the isolated pigment concentrate was maintained at 120° C., and the concentrate was then diluted over a period of 60 minutes with a molten resin mixture containing 244.5 g $X_{1197}$, available from Baker Petrolite, 6 g KEMAMIDE S-180, available from Chemtura Corporation, 58.08 g KE-100, available from Arakawa Corporation, 7.2 g of a urethane resin that is the adduct of three equivalents of stearyl isocyanate and a glycerol-based alcohol, prepared as described in Example 4 of U.S. Pat. No. 6,309,453, and 0.96 g NAUGARD 445, available from Chemtura Corporation. The resulting ink was allowed to stir for 90 minutes at 120° C. and was filtered past a 1 micron filter.

Preparation of Magenta Pigmented Solid Inks

Example 3

Preparation of Ink No. 4

A Union Process 01 attritor pre-heated to 120° C. was charged with 1800 g ⅛" 440 C Grade 25 stainless steel balls, available from Hoover Precision Products, Incorporated, that were also preheated to 120° C. Over the steel shots was poured a molten mixture containing 49.3 g X-1197, available from Baker Petrolite, 29.7 g of a triamide wax (triamide described in U.S. Pat. No. 6,860,930, 29.7 g KEMAMIDE S-180, available from Chemtura Corporation, 29.7 g KE-100, available from Arakawa Corporation, 8.9 g of a urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 0.9 g Foral 85, available from Hercules Incorporated, 0.3 g N445, 5.2 g Compound No. 1 (see Table 3). To this was slowly added 7.8 g Pigment Red 57:1, available from Clariant Corporation. A multi-staged impeller was then attached to the attritor and the speed adjusted to about 250 rpm. The pigmented mixture was allowed to attrite overnight for about 19 hours upon which the resultant ink concentrate showed excellent free-flowing behavior when it was discharged and separated from the steel balls in its molten state. A portion of the isolated pigment concentrate was used for the purposes of making a pigmented solid ink. The beaker containing 103.3 g of the isolated, melted pigment concentrate was maintained at 120° C. which was then diluted slowly over a period of about 30 minutes with a molten resin mixture containing 76.0 g X-1197, available from Baker Petrolite, 5.0 g of a triamide wax (triamide described in U.S. Pat. No. 6,860,930, 13.2 g KEMAMIDE S-180, available from Chemtura Corporation, 5.2 g KE-100, available from Arakawa Corporation, and 0.2 g NAUGARD 445, available from Chemtura Corporation. The ink was allowed to stir for about another 2 hours at 120° C. and was then filtered through a 1 micron filter. An aliquot of the ink was taken for determination of particle size using a Malvern Nanosizer HT apparatus. The particle size thermal stability characteristics found in Table 1 were assessed as the ink was aged over time at 120° C.

Example 4

Preparation of Ink No. 5

A concentrate and ink were prepared accordingly to the procedures described as in Example 3 for Ink No. 4 except that Compound no. 2 was used in place of Compound No. 1 (see Table 3). An aliquot of the ink was taken for determination of 7 particle size using a Malvern Nanosizer HT apparatus. The particle size thermal stability characteristics found in Table 1 were assessed as the ink was aged over time at 120° C.

TABLE 1

Particle Size and thermal stability of yellow inks (Ink No. 1 and 2) and magenta inks (Ink No. 4 and 5)

| Ink No. | Pigment | Dispersant (Compound No.) | Thermal Stability @ 120° C. Zavg (nm) | Days |
|---|---|---|---|---|
| 1 | PY139 | 1 | 124.7-123.6 | 41 |
| 2 | PY180 | 3 | 300-355 | 12 |
| 4 | PR57:1 | 1 | 136-140 | 57 |
| 5 | PR57:1 | 2 | 138-145 | 22 |

TABLE 3

Examples of resinous compounds used in the inks.

| Compound No. | Resinous compound structure |
|---|---|
| 1 | [Structure: long alkyl chain (C30) ester linked via sebacic-type diacid to an amide with tetraethylenepentamine; chain labeled 30 and 32] |
| 2 | [Structure: long alkyl chain ester linked to amide with N-methyl-1,3-propanediamine] |
| 3 | [Structure: long alkyl ester of diacid, amide linked to -(NH-CH$_2$CH$_2$)$_n$-H; n = 1 to 30] |
| 4 | [Structure: branched long alkyl ester, amide linked to -CH$_2$CH$_2$CH$_2$-N$^+$(CH$_3$)$_3$ Me SO$_4^-$] |
| 5 | [Structure: HO-(long chain)-C(=O)-NH-CH$_2$CH$_2$-NH-CH$_2$CH$_2$-NH-CH$_2$CH$_2$-NH-CH$_2$CH$_2$-NH-C(=O)-(long alkyl chain)] |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink composition comprising an ink carrier and a resinous compound of the formula

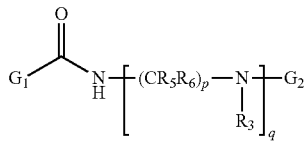

or a salt thereof, wherein:
$G_1$ is —$X_1C(O)OR_1$, —$X_2OC(O)R_2$, or —$X_2OH$;
$G_2$ is $R_4$, —$C(O)R_2$, or —$C(O)X_2OC(O)R_2$;
$R_1$ is an alkyl having from 30 to 50 carbon atoms;
$R_2$ is independently an alkyl having from 2 to 40 carbon atoms;
each $R_3$ and $R_4$ is independently hydrogen, alkyl, arylalkyl or alkylaryl, wherein the $R_3$ attached to the same nitrogen atom as $R_4$ and $R_4$ can be joined together to form a ring;
each $R_5$ and each $R_6$ is independently hydrogen or alkyl;
$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;
t1 is an integer of from 1 to 20;
t2 and t3 is independently an integer of from 0 to 20;
u1 is an integer from 1 to 30;
u2 and u3 is independently an integer from 0 to 30;
each $R_7$ and each $R_8$ is independently hydrogen, alkyl, or alkoxyl;
each $R_9$ and each $R_{10}$ is independently hydrogen, alkyl, or alkoxyl;
Ar is an unsubstituted aromatic moiety;
p is an integer from 1 to 5; and
q is an integer from 1 to 12.

2. The ink composition of claim 1, wherein $R_2$ is an alkyl comprising from 4 to 20 carbon atoms.

3. The ink composition of claim 1, wherein each $R_3$ is hydrogen.

4. The ink composition of claim 1, wherein $G_2$ is $R_4$.

5. The ink composition of claim 1, wherein each $R_5$ and each $R_6$ are hydrogen.

6. The ink composition of claim 1, wherein p is an integer from 2 to 3.

7. The ink composition of claim 1, wherein q is an integer from 1 to 8.

8. An ink composition comprising an ink carrier and a resinous compound having the formula

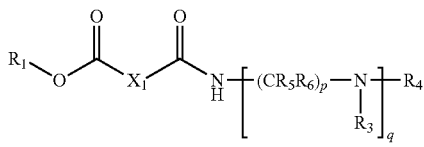

or a salt thereof, wherein:
$R_1$ is an alkyl having from 10 to 80 carbon atoms;
each $R_3$ and $R_4$ is independently hydrogen, alkyl, arylalkyl or alkylaryl, wherein the $R_3$ attached to the same nitrogen atom as $R_4$ and $R_4$ can be joined together to form a ring;
each $R_5$ and each $R_6$ is independently hydrogen or alkyl;
$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
t1 is an integer of from 1 to 20;
t2 and t3 is independently an integer of from 0 to 20;
each $R_7$ and each $R_8$ is independently hydrogen, alkyl, or alkoxyl;
Ar is an unsubstituted aromatic moiety;
p is an integer from 1 to 5; and
q is an integer from 1 to 12.

9. The ink composition of claim 1, further comprises a pigment.

10. The ink composition of claim 1, wherein the resinous compound of the formula I is present in the ink in the amount of from about 0.1 percent to about 30 percent by weight of the ink.

11. The ink composition of claim 1, wherein the ink carrier comprises a wax selected from the group consisting of polyethylene wax, isocyanate-derived resin and wax, ester wax, fatty acid, fatty alcohol, fatty amide, and alkoxylated wax.

12. The ink composition of claim 11, wherein the ink carrier further comprises a branched triamide present in the ink in an amount of from about 0.01 percent to about 30 percent by weight of the ink.

13. The ink composition of claim 11, wherein the ink carrier further comprises a stearyl stearamide present in the ink in an amount of from about 0.5 percent to about 70 percent by weight of the ink.

14. The ink composition of claim 1, further comprises a triglyceride of hydrogenated abietic acid present in the ink in an amount of from about 0.1 percent to about 50 percent by weight of the ink.

15. An ink composition comprising an ink carrier and a resinous compound salt of the formula

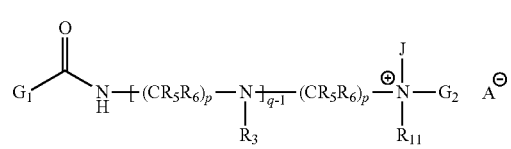

wherein:
$G_1$ is —$X_1C(O)OR_1$, —$X_2OC(O)R_2$, or —$X_2OH$;
$G_2$ is, $R_{12}$, —$C(O)R_2$, —$C(O)X_1C(O)OR_1$, or —$C(O)X_2OC(O)R_2$;
$R_1$ is an alkyl having from 10 to 80 carbon atoms;
$R_2$ is an alkyl having from 2 to 40 carbon atoms;
each $R_3$ is independently hydrogen, alkyl, arylalkyl or alkylaryl;
each $R_{11}$ and $R_{12}$ is independently alkyl, arylalkyl, alkylaryl, or $R_{11}$ and $R_{12}$ can be joined together to form a ring;
each $R_5$ and each $R_6$ is independently hydrogen or lower alkyl;
$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;

t1 is an integer of from 1 to 20;

t2 and t3 is independently an integer of from 0 to 20;

u1 is an integer from 1 to 30;

u2 and u3 is independently an integer from 0 to 30;

each $R_7$ and each $R_8$ is independently hydrogen, alkyl, or alkoxyl;

each $R_9$ and each $R_{10}$ is independently hydrogen, alkyl, or alkoxyl;

Ar is an unsubstituted aromatic moiety;

p is an integer from 1 to 5;

q is an integer from 1 to 12;

$A^\ominus$ is selected from the group consisting of $Cl^-$, $Br^-$, $I^-$, $HSO_4^-$, $HSO_3^-$, $CH_3SO_4^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, and $SbCl_6^-$; and J is alkyl, arylalkyl, or alkylaryl.

16. The ink composition of claim 15, wherein $R_{11}$ and $R_{12}$ is independently methyl or ethyl.

17. The ink composition of claim 15, wherein $A^\ominus$ is $HSO_4^-$.

18. The ink composition of claim 15, further comprises a pigment.

19. The ink composition of claim 15, wherein the ink carrier comprises a wax.

* * * * *